United States Patent [19]

Bourgeois et al.

[11] 4,202,861
[45] May 13, 1980

[54] METHOD FOR DRY REPROCESSING OF IRRADIATED NUCLEAR FUELS

[75] Inventors: Michel Bourgeois, Paris; Georges Manevy, Bievres; Jean-Pierre Roux, Pont St. Esprit, all of France

[73] Assignee: Commissariat a l'Energie Atomique, Paris, France

[21] Appl. No.: 833,683

[22] Filed: Sep. 15, 1977

[30] Foreign Application Priority Data

Sep. 20, 1976 [FR] France ................................ 76 28147

[51] Int. Cl.² ....................... C01G 56/06; C01G 43/06
[52] U.S. Cl. ..................................... 423/19; 423/251; 423/258; 423/259
[58] Field of Search .................. 423/19, 258, 259, 251

[56] References Cited

U.S. PATENT DOCUMENTS

| | | | |
|---|---|---|---|
| 3,098,709 | 7/1963 | Mecham et al. | 423/19 |
| 3,198,598 | 8/1965 | Delange et al. | 423/258 |
| 3,294,493 | 12/1966 | Jonke et al. | 423/19 |
| 3,353,929 | 11/1967 | Knacke et al. | 423/19 |
| 3,720,748 | 3/1973 | Massonne | 423/259 |
| 3,753,920 | 8/1973 | Anastasia et al. | 423/19 |
| 3,790,493 | 2/1974 | Dada et al. | 423/19 |

*Primary Examiner*—Edward A. Miller
*Attorney, Agent, or Firm*—Pearne, Gordon, Sessions

[57] ABSTRACT

Irradiated nuclear fuels consisting primarily of plutonium compounds and/or uranium compounds such as oxides, carbides, nitrides are converted in accordance with the method to plutonium hexafluoride and/or uranium hexafluoride. In a first step, the compounds are contacted within a first zone of an enclosure with a gas mixture containing at least one fluorination reagent. In a second step, the remainder of the compounds which have not been converted to fluorides during the first step is contacted directly within a second zone of the enclosure with a bed which has been fluidized by means of a gas mixture containing at least one fluorination reagent.

10 Claims, 1 Drawing Figure

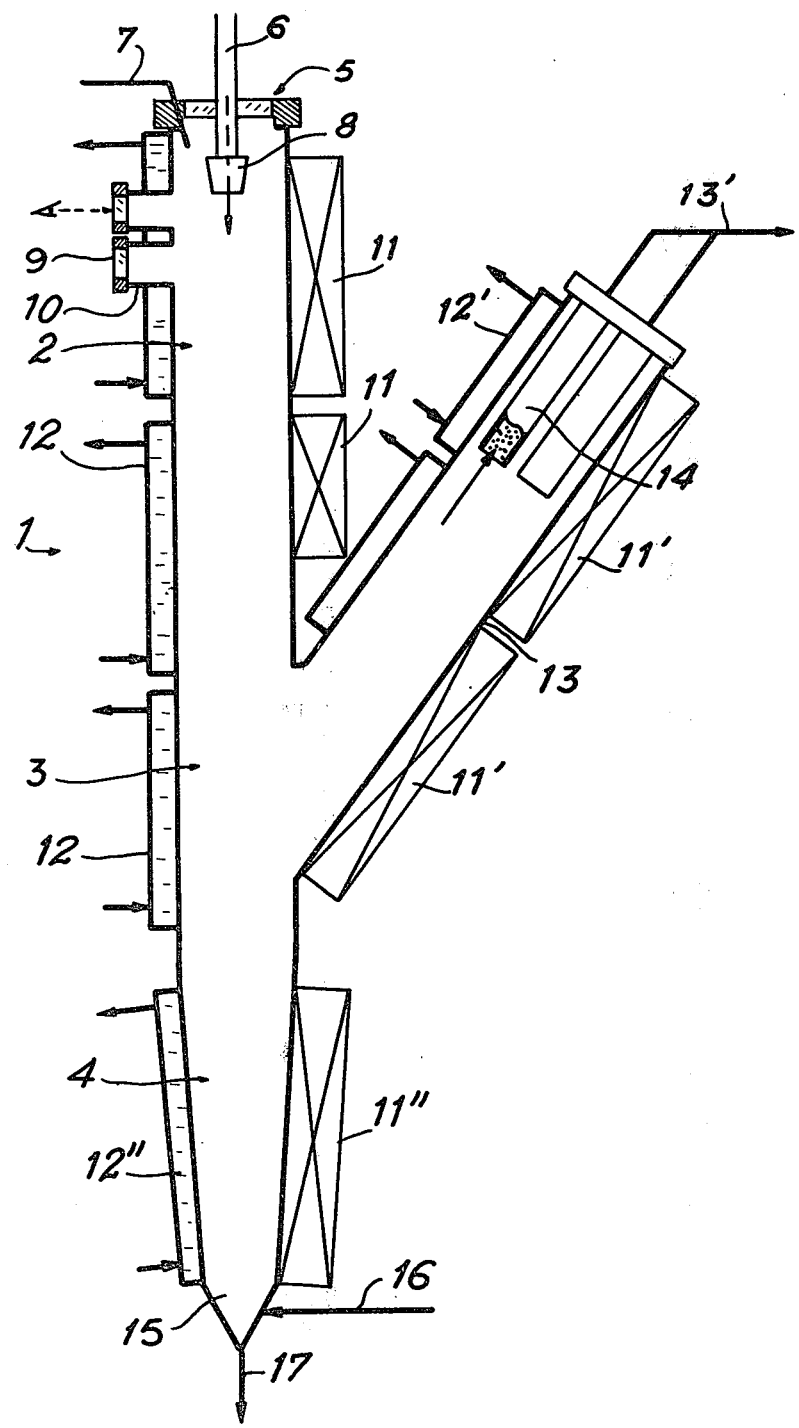

METHOD FOR DRY REPROCESSING OF IRRADIATED NUCLEAR FUELS

This invention relates to a method for dry reprocessing of irradiated nuclear fuels.

It is known that irradiated nuclear fuels such as oxides, carbides or nitrides of plutonium and/or uranium must be converted especially to plutonium hexafluoride and/or to uranium hexafluoride after discharge from fast reactors or light-water reactors; these plutonium and/or uranium compounds are combined with a certain number of other compounds and especially fission products after use in the reactor.

One of the known methods for dry reprocessing of fuels comprising mixed oxides of uranium and plutonium which are employed in fast reactors and light-water reactors consists in attacking said mixed oxides with fluorination reagent gases such as fluorine, bromine pentafluoride, chlorine trifluoride, in a fluidized-bed reaction zone. The solid constituent of the fluidized bed consists of an inert solid; by way of example, this solid can consist of fusion-cast alumina grains of controlled size forming a layer or bed in which are deposited the mixed oxides containing $UO_2$, $PuO_2$ and fission products, the particle size of which is also controlled. The bed is then fluidized by means of a gas mixture containing the selected fluorination reagent gas in variable proportions. There is then formed a volatile salt which chiefly contains the mixture of $UF_6$ and $PuF_6$ as well as certain salts of the fission products; these volatile salts are condensed outside the reaction zone in a fluidized bed in order to treat them separately. In this process, the fluidized bed has a function of a thermal order and must accordingly remove the heat produced at the time of fluorination of the starting oxides and also generated by the fission products which remain diluted throughout its mass at the end of the operation.

The method as described in the foregoing suffers from a certain number of disadvantages. Generally speaking, the reactions of fluorination of plutonium oxide or of plutonium tetrafluoride (reaction intermediary between $PuO_2$ and $PuF_6$) are in fact slow reactions; in the presence of an inert constituent such as the alumina of the fluidized bed, these reactions are even slower. Furthermore, the method under consideration cannot be employed at temperatures above 600° C. by reason of the danger of corrosion of materials of the equipment (nickel or monel metal) and the danger of incorporation of the alumina in the mass of the fluidized bed at temperatures above 600° C.; the fact that the reaction temperatures are limited in this manner also results in a certain slowness of the reactions. In consequence, this fluidized-bed process cannot readily be employed continuously.

Another known method which has been in use up to the present time for reprocessing irradiated nuclear fuels by the dry route consists in introducing the grains of plutonium oxide and/or uranium oxide accompanied by the fission products at the top of a tower or so-called "flame reactor" which contains a fluorination reagent gas. The fuel grains which are separate from each other burn individually as they fall; this accordingly results in spontaneous production of a flame which is self-maintained and remains without any contact with the walls of the reactor. In accordance with this method, fluorination reactions have high rates by virtue of the temperature rise of the reaction medium; the walls of the "flame reactor" are also cooled in order that the heat produced by the flame can be progressively removed. Thus the temperature rise in the reaction medium promotes the formation of $UF_6$ and $PuF_6$ from the point of view of reaction kinetics and also promotes the formation of $PuF_6$ from a thermodynamic point of view since there is a smaller quantity of fluorination reagent to be employed.

A certain number of disadvantages are nevertheless attached to the flame reactor process defined above. In fact, the reactions may not be complete at the level of the flame: products which are either unburnt or partially converted as they pass through the flame leave this latter in the solid state. Furthermore, in the reactor region which is located downstream of the flame zone, the temperature is of intermediate value between that of the flame (namely above 1000° C.) and the outlet temperature of the gases (of the order of 50° to 100° C.): in this zone, some reaction products which have been volatilized in the flame can be recondensed to the solid state (this is the case with the majority of the volatile salts of fission products) or some products can be decomposed (this is the case for example with $PuF_4$ obtained from the decomposition of a fraction of gaseous $PuF_6$ which has already formed in the flame). It is therefore found necessary to re-treat all these solid products which are derived from the flame reactor and still contain a fraction of uranium and especially of the starting plutonium, and to treat them separately with fluorine in order to complete the conversion of these compounds to hexafluorides.

The invention is directed to a method for dry reprocessing of irradiated nuclear fuels which overcomes the disadvantages recalled in the foregoing and permits simple and rapid conversion of uranium and/or plutonium compounds as well as the accompanying fission products to fluorides with a very high degree of efficiency.

The method for dry reprocessing of irradiated nuclear fuels comprising plutonium compounds and/or uranium compounds such as oxides, carbides, nitrides, of the type in which said plutonium compounds and/or uranium compounds are converted to plutonium hexafluoride and/or to uranium hexafluoride in accordance with the invention essentially entails a first step in which said compound or compounds are contacted within a first zone of an enclosure with a gas mixture containing at least one fluorination reagent and a second step in which the remainder of said compounds which have not been converted to fluorides during the first step is contacted directly within a second zone of the enclosure aforesaid with a bed which has been fluidized by means of a gas mixture containing at least one fluorination reagent.

Thus the fact that, in the method according to the invention, the two successive steps defined in the foregoing are carried out within the same enclosure and that the compounds which were not converted to fluorides during the first step are treated directly in the second step offers considerable advantages over the methods of the prior art. In fact, if the solid products not converted to fluorides were treated separately within another reaction vessel, for example, this would entail the need for a transfer either of pneumatic type or of mechanical type and even for intermediate conditioning in order that the products not converted to fluorides may be restored to a correct particle size. Similarly, if the solid products not converted to fluorides were treated by recycling said solid compounds in the same reaction vessel, this would also entail the need to transfer the products. In point of fact, such transfer operations are necessarily difficult since the products which are handled and consist of a mixture of fluorides, oxyfluorides and oxides usually have adhesive properties resulting essentially from the thermal dissipation caused by the radioactivity of the fission products contained therein. It is therefore apparent that the method in accordance with the invention has an extremely advantageous and distinctive feature in that it is possible in a first stage to convert the greater part of the solid starting compounds to fluorides by means of a self-maintained flame reaction and then to subject the remaining solid compounds which have not been converted to fluorides during this first stage to direct treatment by means of a fluidized-bed reaction, these two stages being performed within the same enclosure, thus dispensing with any need for transfer and avoiding any discontinuity.

In more precise terms, the method under consideration consists in the following operations: the irradiated starting nuclear fuels are contacted within the first zone of the enclosure with a gas mixture containing at least one fluorination reagent such as fluorine, bromine pentafluoride, chlorine trifluoride. This accordingly results in the spontaneous production of a flame which remains until the majority of the starting oxides are converted to gaseous hexafluorides. At that moment the solid compounds which have not yet been converted to fluorides fall under gravity within an intermediate zone between the first zone and the second zone of the enclosure and the compounds which have been converted to gaseous fluorides are separated from the remaining solid compounds and removed. Then in the second zone of the enclosure, all the remaining solid compounds derived from the first flame zone are put into contact in a fluidized bed formed by grains of alumina which have been fluidized by a gaseous mixture containing at least one fluorination reagent such as fluorine, bromine pentafluoride, chlorine trifluoride. This accordingly results in final conversion of these remaining solid compounds to fluorides. Said gaseous fluorides are then separated from the last solid residues consisting especially of refractory products.

In accordance with an advantageous feature of the invention, the gas mixture employed in the first step contains at least one fluorination reagent, an inert gas and a make-up fuel gas. This make-up fuel gas is selected from the group comprising hydrogen, hydrocarbons.

In accordance with another advantageous feature of the invention, the gas mixture employed in the second step contains at least one fluorination reagent and an inert gas.

The starting compounds of plutonium and/or uranium can be mixed with a second or further fuel which is either solid, liquid or gaseous. In the case of a solid fuel, this second fuel can consist of carbon.

The solid products released by the rapid combustion are unburnt particles and/or products which have been partially converted to the solid phase and/or reaction products which have been volatilized in the flame and recondensed as they emerge from the flame during cooling of the gases and/or products of redecomposition of a gas phase. One of the products of redecomposition of the gas phase is plutonium tetrafluoride.

The practical operation of the method in accordance with the invention will hereinafter be described in greater detail.

The invention is also concerned with a device for converting solids to gas at high temperature by "total combustion" of said solids. This device forms the subject of the invention and can be employed for the practical application of the method hereinabove described but also for any other non-nuclear application such as production of gas at high temperature from solids and modifications of the physical or chemical state of a solid mass. It is particularly worthy of note in this connection that the device in accordance with the invention can be employed as a boiler, gas turbine or reactor, furnace and so forth.

The device for converting solids to gas at high temperature by "total combustion" of said solids in accordance with the invention essentially comprises from top to bottom within a single enclosure: a first zone of reaction of said solids with a gas mixture which is capable of converting part of said solids to gas at high temperature, said first zone being provided with means for admitting said solids and said gas mixture, an intermediate zone for the separation of said formed gases from the solids which have not been converted to gas, said intermediate zone being provided with means for discharging said formed gases, a second zone of reaction of solids not converted within said first zone with a bed fluidized by a gas mixture which is capable of completing the conversion of said solids to gas at high temperature, said second zone being provided with means for admitting said fluidized bed and means for discharging the remaining solid residues.

The means for discharging the formed gases can comprise a cylindrical duct having its opening in the separation zone within which is placed a device for filtering said formed gases.

In more exact terms, the enclosure of the device under consideration can especially be of cylindrical shape and placed vertically. The first zone of said enclosure or so-called flame reaction zone is located in the upper portion of said enclosure. Said first zone is provided with means for admitting the solid to be converted and means for admitting the gas mixture which can be constituted by one or a number of pipes having their openings at the top of the enclosure. The intermediate zone of the enclosure or so-called separation zone within which the solid compounds not converted to gas fall under gravity comprises means for discharging the formed gases which can be constituted by a cylindrical duct having its opening in said separation zone. The second zone or so-called fluidized bed zone is located beneath the intermediate separation zone and comprises means for admitting the fluidized bed and means for discharging the remaining solid residues, said means being constituted respectively by pipes which open into the lower portion of the enclosure.

A more complete understanding of the distinctive features and utilization of the device in accordance with the invention will be obtained from the following description. Reference will be made to the accompanying FIGURE which provides a diagrammatic sectional view of one embodiment of the device under consideration. For the sake of greater convenience, the following description relates to the practical application of the method for dry reprocessing of irradiated nuclear fuels as defined in the foregoing. It will be readily understood, however, that this does not imply any limitation so far as the present invention is concerned and that the device herein described can be employed for the utilization of any other method of conversion of a solid to a gas at high temperature.

The device shown in the accompanying FIGURE comprises a single enclosure 1. From the top downwards, this enclosure has a first zone 2 or so-called "flame zone", an intermediate zone 3 or so-called "settling zone", a second zone 4 or so-called "fluidized bed zone".

The top portion of the enclosure 1 is provided with a closure plate 5 through which passes a pipe 6 for the supply of irradiated nuclear fuel powder and of inert gas and another pipe 7 for the supply of fluorination reagent. The lower portion 8 of the pipe 6 can perform the function of a burner. The flame zone 2 is provided with windows 9 mounted at the ends of lateral nozzles 10 below the plane of discharge of the burner 8 in order to observe the flame which is produced. The walls of the flame zone 2 can be provided outside the enclosure, either with heating means 11 (such as resistance coils) or with cooling means 12 (such as the circulation of a cold fluid within a double casing or jacket). The use of heating means 11 or cooling means 12 depends on the nature of the fuels being treated and on the rates of operation in relation to the characteristics of the apparatus.

There opens into the intermediate zone 3 or so-called separation zone of the enclosure 1 a cylindrical duct 13 for evacuating the gaseous fluorides which are formed. In this separation zone 3, the solid components not converted to gas are separated by settling of the formed gaseous fluorides and fall under the action of gravity into the bottom portion of the enclosure which constitutes the fluidized bed zone 4 whereas the formed gaseous fluorides are discharged through the duct 13 at 13'. Said duct 13 is fitted with filters 14 for retaining the small solid particles which may have been carried away by the gases discharged from the separation zone 3. Said duct 13 is also provided with cooling means 12' (such as a jacket for the circulation of cold fluid) and heating means 11' (such as resistance coils).

The lower end 15 of the fluidized bed zone 4 terminates in a cone frustum. There opens into this frusto-conical portion 15 a pipe 16 for the supply of a mixture of fluorination reagent and inert gas and a pipe 17 for the removal of the last remaining solid residues. The walls of the fluidized bed zone 4 can be provided either with heating means 11" (such as resistance coils) or with cooling means 12" such as a jacket for the circulation of cold fluid).

In this particular case of utilization of the apparatus under consideration for reprocessing irradiated nuclear fuels, the operation is performed as follows:

The powder of the mixture of oxides $UO_2$ and $PuO_2$ of the fission products together with an inert gas is introduced through the pipe 6. Fluorine is introduced at the same time through the pipe 7. A flame is produced spontaneously at the level of the portion 8 of the pipe 6 and this flame is self-maintained until the majority of the products are burnt; this flame is observed through the windows 9. The burner 8 can be provided in addition to the central fuel powder supply orifice with one or more additional orifices which are concentric with said central orifice and form rings for introducing different gases of suitable type into the enclosure.

The gaseous effluents issuing from the flame zone 2 as well as the solids which have not been completely converted to gas or have remained solid in the flame are cooled during their transition within the zone 2 by the means 12.

Within the separation zone 3, the separation of the compounds which have remained solid from the formed gases is carried out by settling. Whereas the majority of the solid particles fall into the zone 4 of the enclosure under the action of gravity, the gaseous effluents comprising a mixture of excess fluorine, oxygen, $UF_6$, $PuF_6$ and a few volatile salts of the fission products are directed to the filters 14 through the duct 13.

The fluidized bed zone 4 comprises a bed of solid particles of alumina mixed with the particles of solid compounds not converted to fluorides; this bed is fluidized by a mixture of fluorine and inert gas which is admitted through the pipe 16. As a result of the conical shape of the bottom portion 15 of said zone 4, agitation of the solid constituents of the fluidized bed thus takes place. This is made necessary by the fact that incomplete agitation can produce a temperature rise by reason of the exothermic reactions which are capable of developing with the solid compounds not yet converted to fluorides and that such a temperature rise could result in sintering of the solid particles and prevent the reactions from taking place. This fluidized bed zone can be heated by the heating means 11" during transfer of the fluidization mixture through the bed of solid particles. Said zone can also be cooled by any suitable device as designated by the reference 12".

The gaseous effluent formed in the upper portion of the fluidized bed zone 4 and which comprises a mixture of fluorine gas and gaseous $PuF_6$ is transferred through the duct 13 to the filters 14. The rate of plutonium depletion of the fluidized bed can be maintained at a high and uniform value by external vibration of the enclosure or by frequent reverse blowing with an inert gas or fluorine which is passed through the filters 14. These filters 14 are mounted in parallel so that one of these latter is in operation while the other is cleared by means of a reverse gas stream.

The reactions which take place within the flame zone 2 and within the fluidized bed zone 4 can be carried out at the same time. They can also proceed independently, for example in accordance with alternate operation of the flame zone 2 and then the fluidized bed zone 4. Agitation of said fluidized bed can always be performed by means of suitable streams of inert gas during operation of the flame zone 2. During periodic interruptions in the operation of either one zone or the other, the zone which is not in operation can be swept with a purge flow of suitable inert gas.

The device in accordance with the invention is capable of operating in practice either continuously or semi-continuously if a suitable device is employed for supplying the flame zone 2 with powdered fuel. For example, it is possible to employ for this purpose a feed unit of the type comprising a hopper and screw conveyor, a suitable mechanism for introducing the solid constituent of the fluidized bed into the zone 4 as well as a suitable mechanism for continuous or intermittent removal of the depleted charge from the fluidized bed.

The compositions of the gas mixtures introduced at 7 and at 16 are dependent on the reactions to be carried out and therefore on the nature of the fuels to be reprocessed and supplied at 6 as well as on the depletion to be achieved in the fluidized bed. The devices for regulating the compositions of these gas mixtures and introducing them into the apparatus are not illustrated in the accompanying figure.

It should be mentioned by way of indication that, in the case of a device of the type described in the foregoing and provided with an enclosure 1 having an internal diameter of 80 mm, a frusto-conical bottom portion 4 having an angle of conicity of 2°, and having a feed rate at 6 of 5 kg/hour of powder consisting of mixed oxide $UO_2$–$PuO_2$ and fission products, a conversion of $UO_2$ to $UF_6$ of 90 to 99% and a conversion of $PuO_2$ to $PuF_6$ of 70 to 85% are obtained at the outlet of the flame zone 2. Within the fluidized bed zone 4, the grains of fusion-cast alumina have a dimension within the range of 200 to 250 microns; the temperature of this fluidized bed zone 4 is within the range of 300° to 600° C. After fluorination within said fluidized bed zone 4, the conversion yields of uranium and plutonium oxides to hexafluorides attain 99.9%. It is found that there is no accumulation of plutonium in the fluidized bed if the rate of feed of nuclear fuel is adjusted at the outset within the flame zone as a function of the rate of fluorination of the plutonium within the fluidized bed.

It follows from the foregoing that, by making use of the method and the apparatus in accordance with the invention, the first processing step within the flame zone 2 makes it possible to convert practically the entire quantity of uranium oxide and a high proportion of the plutonium oxide to hexafluorides. The second step carried out within the fluidized bed zone 4 is extremely reliable by reason of the fact that the quantity of oxides remaining to be treated within said fluidized bed is much smaller than in the event of direct treatment of nuclear fuels by said fluidized bed. This accordingly has the effect of distinctly reducing the dangers of setting in the mass of the fluidized bed as a result of the exothermic character of the reactions.

It is recalled that the application of the device in accordance with the invention to the method of dry reprocessing of nuclear fuels as described in the foregoing is not given by way of limitation and that any other use of this device can accordingly be contemplated.

Thus the device under consideration can be used for any combustion treatment requiring two reaction zones in which the first zone makes it possible to carry out simultaneous gas-gas, gas-solid and gas-liquid reactions in rapid combustion with production of gaseous and solid effluents whilst the second zone which is supplied naturally with these solids serve to carry out fluidized bed reactions.

One application which deserves special mention is the use of the device in accordance with the invention as an apparatus for the combustion of coal which is capable of burning quantities of coal exceeding 10 tonnes per hour. In an operation of this type, the finely ground coal is introduced at 6 and air is introduced at 7. A proportion of the gases obtained at the outlet of the zone 2 is removed via the duct 13 whereas the residues of pulverized coal, cinders, slag and unburnt residues are placed within the bed of the zone 4, fluidized by means of a hot air stream which is admitted at 16. Thus the last unburnt residues from zone 2 are burnt and converted to gases which are removed via the duct 13.

What we claim is:

1. A method for dry reprocessing of irradiated nuclear fuels in the solid particulate state selected from the group consisting of the oxides, carbides and nitrides of plutonium and/or uranium and mixtures thereof comprising a first step wherein said nuclear fuels are contacted within a first zone of an enclosure with a first gas mixture containing at least one first fluorination reagent to convert at least a portion of said nuclear fuels to gaseous plutonium and/or uranium hexafluorides in a self-maintained flame reaction, and a second step wherein a remaining portion of said nuclear fuels not converted to gaseous hexafluorides in said first step is contacted directly within a second zone of said enclosure with a fluidized bed which has been fluidized by means of a second gas mixture containing at least one second fluorination reagent.

2. A method according to claim 1, wherein on completion of the first step, the gaseous hexafluorides formed in the first step are separated from the solid particulate nuclear fuels which have not been converted to gaseous hexafluorides.

3. A method according to claim 1, wherein the first gas mixture employed in the first step also contains as inert gas and a make-up fuel gas.

4. A method according to claim 3, wherein the make-up fuel gas is selected from the group consisting of hydrogen and hydrocarbons.

5. A method according to claim 1, wherein the second gas mixture employed in the second step also contains an inert gas.

6. A method according to claim 1, wherein the fluorination reagent is fluorine.

7. A method according to claim 1, wherein the particulate nuclear fuels are mixed with a further fuel which is either solid, liquid or gaseous prior to being introduced into said first zone.

8. A method according to claim 7, wherein the further fuel is carbon.

9. A method according to claim 1, wherein the fluidized bed includes as a solid constituent a granular compound which is inert with respect to the fluorination reagent.

10. A method according to claim 1, wherein the second step is carried out at a temperature within the range of 300° to 600° C.

* * * * *